United States Patent
Shanbhag (10) Patent No.: US 11,172,353 B2
(45) Date of Patent: Nov. 9, 2021

(54) BAND STEERING WI-FI DIRECT CLIENT CONNECTIONS TO DUAL BAND WI-FI DIRECT AUTONOMOUS GROUP OWNER

(71) Applicant: Harman Becker Automotive Systems GmbH, Karlsbad (DE)

(72) Inventor: Sandeep Shanbhag, Bangalore (IN)

(73) Assignee: Harman Becker Automotive Systems GmbH, Karlsbad (DE)

( * ) Notice: Subject to any disclaimer, the term of this patent is extended or adjusted under 35 U.S.C. 154(b) by 24 days.

(21) Appl. No.: 16/462,193

(22) PCT Filed: Nov. 23, 2016

(86) PCT No.: PCT/IB2016/057065
§ 371 (c)(1),
(2) Date: May 17, 2019

(87) PCT Pub. No.: WO2018/096383
PCT Pub. Date: May 31, 2018

(65) Prior Publication Data
US 2019/0281446 A1 Sep. 12, 2019

(51) Int. Cl.
*H04W 8/22* (2009.01)
*H04W 76/14* (2018.01)
(Continued)

(52) U.S. Cl.
CPC ............ *H04W 8/22* (2013.01); *H04W 48/14* (2013.01); *H04W 72/0453* (2013.01); *H04W 76/14* (2018.02); *H04W 84/12* (2013.01)

(58) Field of Classification Search
CPC .... H04N 19/176; H04N 19/117; H04N 19/70; H04N 19/105; H04N 19/132;
(Continued)

(56) References Cited

U.S. PATENT DOCUMENTS

2007/0281711 A1   12/2007  Matta
2012/0224569 A1*   9/2012  Kubota ................ H04W 84/20
                                              370/338
(Continued)

FOREIGN PATENT DOCUMENTS

CN         102461329 A    5/2012
CN         103327454 A    9/2013
(Continued)

OTHER PUBLICATIONS

Park, G. et al., "Band adjustment (between 2.4GHz and 5GHz) for AP discovery," IEEE Standards Association Website, Available Online at https://mentor.ieee.org/802.11/documents?is_dcn=Band%20adjustment, Sep. 6, 2012, 15 pages.
(Continued)

*Primary Examiner* — Natasha W Cosme
(74) *Attorney, Agent, or Firm* — McCoy Russell LLP (57) ABSTRACT

A band steering method and a system for a wireless network is disclosed. The network comprises a first and a second radio band, an access node, and a plurality of client devices having single or dual band capability. According to the method, the access node receives a probe request from one of said client devices on the first or second radio band. The probe request indicates whether the client device has single or dual band capability. Thereafter, a probe response is generated by the access node only if the probe request indicates that the client device has single band capability, or if the probe request indicates that the client device has dual band capability and the probe request is received by the access node on the second radio band. On receiving the probe response the client device can use the appropriate radio band for communications within the network.

17 Claims, 3 Drawing Sheets

(51) Int. Cl.
*H04W 48/14* (2009.01)
*H04W 72/04* (2009.01)
*H04W 84/12* (2009.01)

(58) Field of Classification Search
CPC .. H04N 19/186; H04N 19/159; H04N 19/593; H04N 19/182; H04N 19/119; H04N 19/13; H04N 19/157; H04N 19/51; H04N 19/61; H04N 19/91; H04N 19/96; H04N 19/174; H04N 19/50; H04N 19/513; H04N 19/86
See application file for complete search history.

(56) References Cited

U.S. PATENT DOCUMENTS

| | | | | |
|---|---|---|---|---|
| 2012/0243474 | A1* | 9/2012 | Iyer | H04L 63/1466 370/328 |
| 2012/0322481 | A1 | 12/2012 | Laroche et al. | |
| 2016/0100352 | A1 | 4/2016 | Yunoki | |
| 2016/0288744 | A1* | 10/2016 | Rutherford | B60L 1/00 |

FOREIGN PATENT DOCUMENTS

| | | |
|---|---|---|
| CN | 103428808 A | 12/2013 |
| CN | 204168313 U | 2/2015 |
| CN | 104955102 A | 9/2015 |
| CN | 104956735 A | 9/2015 |
| CN | 105357743 A | 2/2016 |
| CN | 111417171 A | 7/2020 |
| EP | 2883392 B1 | 5/2019 |
| KR | 20130109420 A | 10/2013 |
| WO | 2015197653 A1 | 12/2015 |

OTHER PUBLICATIONS

"Lancom Techpaper—WLAN Band Steering," Continca Solutions Website, Available Online at http://www.contica.pl/gfx/contica/userfiles/_public/specyfikacje_en/techpaper/tp-wlan-band-steering-en.pdf, Sep. 1, 2012, 4 pages.

"Study on the use of Wi-Fi for Metropolitan Area applications," Ofcom Website, Available Online at https://www.ofcom.org.uk/_data/assets/pdf_file/0022/46309/wifi-report.pdf, Apr. 22, 2013, 77 pages.

ISA European Patent Office, International Search Report and Written Opinion Issued in Application No. PCT/IB2016/057065, dated Apr. 28, 2017, WIPO, 16 pages.

Lee, J. et al., "Evaluation on Enterprise WLAN Techniques," Proceedings of the 2013 Fourth International Conference on the Network of the Future (NoF), Pohang, South Korea, Oct. 23, 2013, 3 pages.

Fretz, K. et al., "Overview of Radiation Belt Storm Probes Fault Management System," Proceedings of the IEEE 2013 Aerospace Conference, Mar. 2, 2013, Big Sky, Montana, 12 pages.

Lee, J. et al., "Evaluation on Enterprise WLAN Techniques," Proceedings of the 2013 Fourth International Conference on the Network of the Future (NoF), Oct. 23, 2013, Pohang, South Korea, 3 pages.

"IEEE Standard for Calibration of Electromagnetic Field Sensors and Probes (Excluding Antennas) from 9 kHz to 40 GHz," EMC/SDCom—Standards Development Committee, Oct. 31, 2013, 231 pages.

Feng, G., "Huawei ICT Certification Series: HCNA-WLAN study guide(Chinese Edition)" Publishing Department of People's Posts and Telecommunications Publishing House, Beijing, Available as Early as Nov. 1, 2015, 478 pages. (Submitted with English Abstract). State Intellectual Property Office of the People's Republic of China, Notice of Allowance Issued in Application No. 201680090331.6, Aug. 24, 2021, 9 pages. (Submitted with Partial Translation).

* cited by examiner

BAND STEERING WI-FI DIRECT CLIENT CONNECTIONS TO DUAL BAND WI-FI DIRECT AUTONOMOUS GROUP OWNER

CROSS REFERENCE TO RELATED APPLICATIONS

The present application is a national phase of International Application No. PCT/M2016/057065 entitled "BAND STEERING WI-FI DIRECT CLIENT CONNECTIONS TO DUAL BAND WI-FI DIRECT AUTONOMOUS GROUP OWNER", and filed on Nov. 23, 2016. The entire contents of the above-identified application are hereby incorporated by reference for all purposes.

TECHNICAL FIELD

The present invention generally relates to a band steering method for a wireless network and a system for implementing the same. More particularly it relates to a band steering method and system for steering remote client devices to appropriate (Wi-Fi) radio bands or channels in a Wi-Fi Direct set up.

BACKGROUND OF THE INVENTION

Wi-Fi Direct is a new technological advancement in Wi-Fi technology which aims to provide Peer-to-Peer connection between Wi-Fi devices and is also known as Wi-Fi Peer-to-Peer (P2P). In the earlier Wi-Fi technology, i.e. the legacy Wi-Fi Infrastructure network, the device is either supposed to play the role of a Wi-Fi station or a Wi-Fi Access Point. In legacy Infrastructure network a Station (STA) can connect to an access point (AP) but an STA cannot connect to an STA or an AP cannot connect to another AP. So if there are two devices that support the station role then they cannot connect to each other but require an AP in between to communicate with each other.

Most of the modern day devices, for example smartphones, support STA feature by default and hence it is not possible to communicate with each other if they want to exchange any information. To bridge this gap a new topology called Wi-Fi Direct was introduced. Using Wi-Fi Direct topology many devices can form a group and transfer any kind of data with each other.

In Wi-Fi Direct there are two ways in which a common group can be formed and peers in the group can exchange data. In the first method, the negotiation and group formation method, both the peer devices trying to communicate with each other play the role of a P2P Device. In order to connect to each other, they carry out a negotiation procedure during which one peer becomes a Group Owner and the other a Group Client. The Group Owner is synonymous to a legacy access point (AP), it is a beaconing entity. The Group Client is synonymous to a legacy station (STA). The Group Client connects to the Group Owner, thereafter several other client devices can also connect to the same Group Owner and become a part of the group.

In the second method, the Autonomous Group Owner Role method, a Wi-Fi Direct client from the boot-up stage takes the role of a Group Owner, also known as Autonomous Group Owner (AGO). After initialization it starts beaconing. The other peer devices can discover this group owner and connect to it without going through the tedious Wi-Fi Direct negotiation procedure, as described in the first method.

With the advancement in Wi-Fi chipset technology more and more semiconductor manufacturers are able to design and fabricate real dual band Wi-Fi chipsets. There is huge demand from various product manufacturers for such dual band Wi-Fi chipsets. With this advancement most of the modern Wi-Fi products have started supporting both the Wi-Fi ISM (industrial, scientific, and medical) bands, namely 2.4 GHz and 5 GHz. As a result of this advancement the Wi-Fi products that support both the Wi-Fi ISM bands are being majorly introduced into existing networks that previously only contained single band supporting Wi-Fi devices or remote client devices, i.e. only 2.4 GHz.

Product manufacturers prefer that all Wi-Fi roles are supported, namely group client role and group owner role, in both the bands by the client devices so that all Wi-Fi features can be supported on both the bands. And thus all Wi-Fi features shall be available to both categories of remote devices, namely devices that support single band and devices that support dual band. Wi-Fi Direct or Wi-Fi Peer-to-Peer (P2P) role can be supported in both the Wi-Fi ISM Bands, namely 2.4 GHz and 5 GHz. Many original equipment manufacturers, especially Automotive OEMs, are demanding support for Wi-Fi Direct Autonomous Group Owner (AGO) role in both the bands on an Infotainment Head-Unit system. Therefore, dual band access nodes that support both the radio bands are found in most wireless networks these days.

It is preferred to have a homogenous wireless network whereby the SSID, device name and security parameters for access nodes on both the bands is exactly the same and they appear as a single network to the wireless client devices. Due to this configuration a remote client device, which is dual-band capable, shall discover the access nodes on both the bands but due to the same discovery address (SSID) and device name of the access nodes only one is visible to the end user as a single network. This creates a problem. There is no standard way of controlling to which band of the access node the dual-band capable remote devices shall connect to.

Every remote client device has its own algorithm for selecting which band of the access node to prefer for connection. So the dual band capable remote device can connect to the access node on the 2.4 GHz frequency channel or radio band of the network instead of connecting to the 5 GHz channel or (Wi-Fi) radio band. This is not at all desirable due to decreased performance and quality in terms of throughput for the end feature where these network devices are in use.

It is preferable for client devices to use the 5 GHz band over the 2.4 GHz band as the 5 GHz band offers lower interference and higher throughput capabilities which guarantees better quality for any end feature that works on the wireless network. Hence it is always desirable that a dual-band capable remote client device always connects to a 5 GHz network rather than to a 2.4 GHz network.

Another issue that arises when dual-band capable devices connect to the 2.4 GHz band is that of undesirable bandwidth sharing on the 2.4 GHz band of the access node in contrast to a complete wastage of bandwidth on the 5 GHz band of the access node. The 2.4 GHz band of the access node and the 5 GHz band of the access node have their own independent bandwidth to offer to their clients on a dual band chipset. But if the dual-band capable remote client devices as well as the single-band capable remote client devices all connect to the 2.4 GHz band of the access node then the bandwidth of 2.4 GHz band of the access node gets unnecessarily shared between many remote client devices resulting in bad quality and user experience whereas the bandwidth of the 5 GHz access node gets wasted due to no or very few connections.

To address these problems a technique known as band steering is practiced that steers dual-band capable access nodes to the desirable 5 GHz radio band instead of the more congested 2.4 GHz radio band. But there exists no standard, optimized and simple way of controlling to which band access node the dual-band capable remote devices shall connect to.

SUMMARY OF THE INVENTION

According to an embodiment, there is provided a band steering method and a system for a wireless network for steering remote client devices to appropriate (Wi-Fi) radio bands.

The network comprises a first and a second radio band, an access node, and a plurality of client devices. The client devices either have single or dual band capability. According to the method, the access node receives a probe request from one of said client devices on the first or second radio band. The probe request indicates whether the client device has single or dual band capability. Thereafter, a probe response is generated by the access node only if the probe request indicates that the client device has single band capability, or if the probe request indicates that the client device has dual band capability and the probe request is received by the access node on the second radio band. On receiving the probe response the client device can use the appropriate radio band for communications within the network.

In one of many embodiments the client device is a mobile phone, a tablet, a laptop, a hand held mobile platform unit or any other similar portable device.

Conventional systems use Media Access Control (MAC) addresses of the wireless client devices to prepare a machine-based classification pattern based on which band steering is implemented for new wireless client devices. In contrast to such systems, by using information residing in the probe request to band-steer wireless client devices into appropriate radio bands, there is no need for a prior classification or pattern to be prepared for new incoming wireless client devices. Therefore, a dynamic, speedy and an optimized band steering mechanism can be implemented using the method in accordance with the above embodiment.

In one embodiment, the probe request comprises a WPS information element. This WPS information element is related to the client device using Wi-Fi Protected Setup (WPS) Protocol. According to one embodiment, the network is a Wi-Fi Direct network and each client device has a corresponding WPS information element which indicates if the client device has single band or dual band capability. All Wi-Fi Direct devices use WPS (Wi-Fi Protected Setup) security protocol during connection. During the handshake process between the two devices trying to connect to each other, both devices indicate support and capability parameters of the WPS protocol by including this WPS information element consisting of many attributes in the various Wi-Fi management frames as defined by the standard specification. Probe-Request is also one of the management frames that is mandated to include this WPS information element. The advantage of using the WPS information element is that it is already available and can be readily made use of without having to rely on any previously prepared listing of MAC addresses for band steering of the client devices.

In one embodiment, the access node is located in an automotive infotainment head unit. The access node may be present in an automobile head unit. The head unit comprises a set of software and hardware units that together provide information as well as entertainment to the users. It can also perform automotive control functions. Automotive infotainment systems have many wireless client devices simultaneously trying to establish a connection to be able to use the available radio bands. Having a band-steering mechanism as disclosed herein implemented for an automotive infotainment system that uses a head unit, the bandwidth utilization of the system can be regulated in a favorable manner and overcrowding of any one band can be avoided.

In one embodiment, the access node is a dual band Wi-Fi Direct or Wi-Fi Peer-to-Peer (P2P) Autonomous Group Owner. As an Autonomous Group Owner it starts beaconing and makes itself visible to the other peer or client devices. The other peer devices can discover this group owner and connect to it without going through a typically tedious ordinary Wi-Fi Direct negotiation procedure.

In another embodiment, the radio bands support Wi-Fi Direct or Wi-Fi P2P group owner role and Wi-Fi Direct or Wi-Fi P2P client role. By supporting all Wi-Fi roles in both the bands, namely group client role and group owner role, all Wi-Fi features can be supported on both the bands and all Wi-Fi features are available to both categories of remote devices, namely devices that support single band and devices that support dual band.

In an exemplary embodiment, the method is implemented by a Wi-Fi chipset firmware. In another embodiment, the method is implemented by a Wi-Fi driver. The advantage of implementing the method through Wi-Fi chipset firmware or Wi-Fi driver is that it provides flexibility as to updates or changes required by different users. Wi-Fi chipsets or drivers can be updated as and when new features and updates need to be added or installed into the systems where these drivers or chipsets are used for implementing the claimed method. Thereby, the possibility of future developments are not shut out from the system. In addition the chipset or drivers can be later integrated with different devices as desired by the user.

According to an embodiment, one of the attributes in the WPS information element is an RF band attribute which indicates if the device sending the WPS-IE in the management frame is a dual band device or a single band device. In an exemplary embodiment, dual band devices have this RF band attribute as "RF Bands: 2.4 and 5 GHz (0×03)" and single band devices have this attribute "RF Bands: 2.4 GHz (0×01)". The RF band attribute in the WPS information element is readily available and the information is easily readable. According to another embodiment, the WPS information element comprises Wi-Fi Protected Setup Protocol parameters.

In one embodiment, the first radio band is a 2.4 GHz industrial, scientific and medical (ISM) radio band and the second radio band is a 5 GHz ISM radio band.

According to an embodiment, a system is provided comprising a controller and a network. The network comprises an access node controlled by the controller, a first and a second radio bands and a plurality of client devices. The client devices either have single or dual band capability. The access node is arranged to receive a probe request from one of said client devices on the first or second radio band. The probe request indicates whether the client device has single or dual band capability. The access node is further arranged to generate a probe response only if the probe request indicates that the client device has single band capability, or if the probe request indicates that the client device has dual band capability, provided the probe request is received by the access node on the second radio band in the second case. On receiving a probe response from the access node on either of the said two bands, in reply to its probe request, the client device can then use the appropriate radio band for communications within the network. This helps in effective steering of client devices to avoid over crowding of a specific radio band and thereby resulting in a balanced bandwidth usage amongst several client devices.

According to an embodiment the system further comprises a memory unit for storing a list of client devices found to be dual band capable. The controller may save in the memory unit the result of determination as to which of the client devices are single band capable client devices and/or which are dual band capable client devices. This list can be utilized in future to save time.

In accordance with another embodiment, there is provided a computer-program product having a non-transitory computer readable medium storing computer executable code which, when executed by computer, causes the above method to be performed.

BRIEF DESCRIPTION OF THE DRAWINGS

The present invention may be better understood from reading the following description of non-limiting embodiments, with reference to the attached drawings, wherein.

DETAILED DESCRIPTION OF THE PREFERRED EMBODIMENTS

A typical Wi-Fi network consists of several remote client devices, radio channels or bands and access nodes on the radio bands. Wi-Fi Direct or Wi-Fi Peer-to-Peer (P2P) client devices or remote client devices discover the access nodes on a remote device by a standard Wi-Fi Direct discovery phase. During the discovery phase, the Wi-Fi Direct client devices send a probe request packets to the access node and the access node responds back with probe response packets. During this, the client devices scan all available Wi-Fi channels by transmitting probe request packets on the channels trying to connect to an access node on the wireless network. A dual band supporting client device would scan all 2.4 GHz and 5 GHz radio bands or channels whereas a single band client would scan only 2.4 GHz channels. A single band access node supports only a single band, for example either a 2.4 GHz band or a 5 GHz band, whereas a dual band access nodes supports both the radio bands.

A 5 GHz access node gets discovered in the scan phase on responding to the probe request on its 5 GHz operating channel. Similarly a 2.4 GHz access node gets discovered on responding to the probe request on its 2.4 GHz operating channel.

Figure 1:
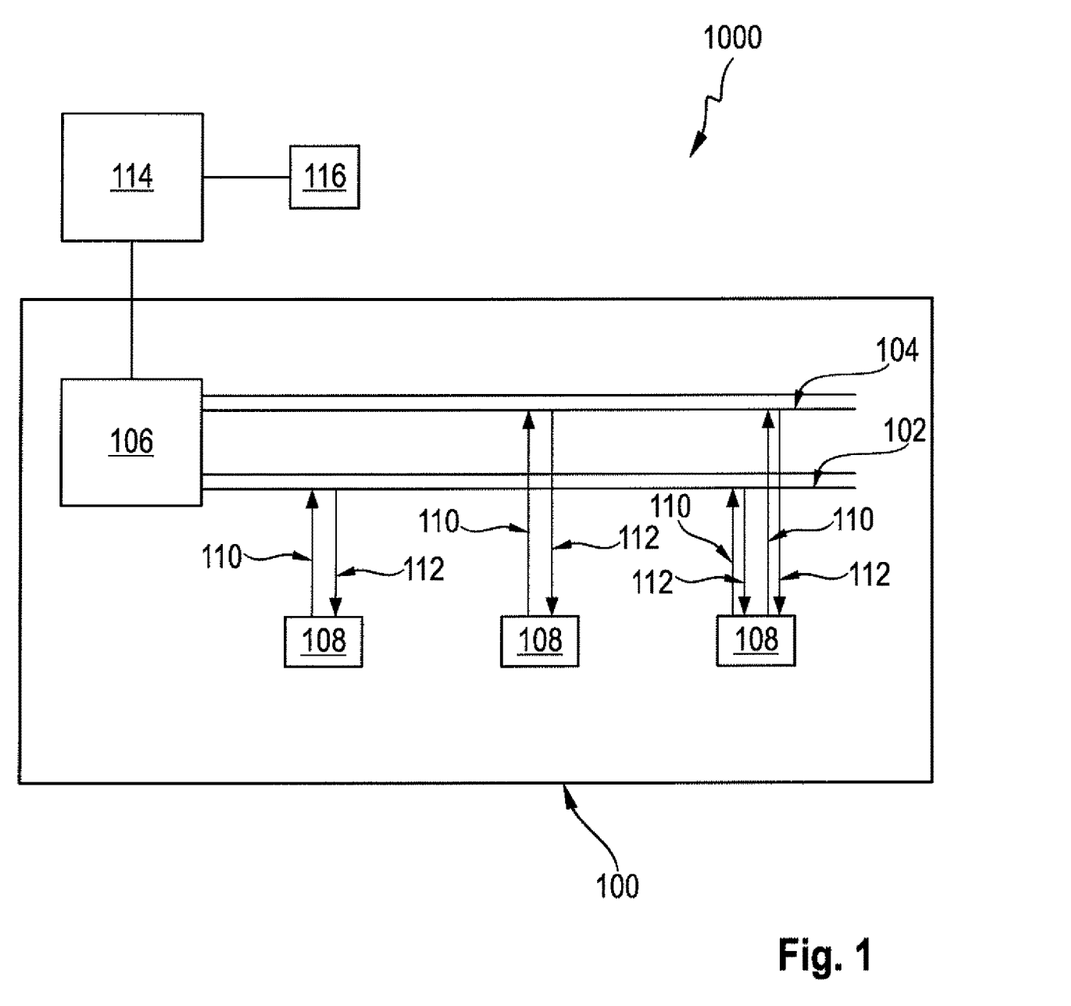
FIG. 1 schematically shows an example system in accordance with one of a number of embodiments.

FIG. 1 shows an example system 1000 in accordance with one of a number of embodiments. The system 1000 comprises a network 100 and a controller 114. The network further comprises a dual band access node 106, which is controlled by the controller 114, radio bands 102, 104 available to the access node 106, and a plurality of client devices 108. These client devices 108 either have single band capability or dual band capability, i.e. the client devices 108 can communicate with the access node and/or each other through one or both of the radio bands 102, 104.

The system 1000 may include one or more Wi-Fi radio bands 102, 104. In an exemplary embodiment the system 1000 the network 100 includes two Wi-Fi radio bands, the first 102 radio band is a 2.4 GHz industrial, scientific and medical (ISM) radio band and the second 104 radio band is a 5 GHz ISM radio band. The system 1000 further includes one or more client devices 108 having either single band capability or dual band capability.

Each client device 108 may contain a transmitting unit (not shown in the figure) for transmitting a probe request 110 on the radio bands 102, 104 to the access node 106 for seeking to establish a connection through a radio band 102, 104 for communication purposes. The access nodes 106, 108 may play the role of a dual band Autonomous Group Owner in a Wi-Fi Direct (Wi-Fi Peer-to-Peer (P2P)) network having two radio bands or channels, namely 2.4 GHz. channel 102 and 5 GHz channel 104.

The controller 114 is in operable connection with the access node 106. The controller 100 determines whether the client device 102, 104 has single band capability or dual band capability from the content of the probe request 110 received by the access node 106. To determine this capability of the client devices 108, the controller 110 makes use of a WPS information element present in the probe request 110.

The WPS information element indicates if the client device 108 has single band capability or dual band capability. Single band capability indicates that the client device 108 is capable of communicating on the first radio band 102 and dual band capability means the client device 108 is capable of communicating on both the radio frequency bands 102, 104.

According to an embodiment as shown in FIG. 1, during a Wi-Fi Direct discovery phase, all client devices do a channel scan by sending probe requests 110 on the radio bands 102, 104 depending on their capabilities. For example, a single band capable client device 108 scans the first radio band 102, i.e. 2.4 GHz channel. The dual band remote device or the client device 108 which is capable of communicating on both the radio frequency bands 102, 104 initially does a full-channel scan by sending probe requests 110 on both radio bands 102, 104, i.e. 2.4 GHz and 5 GHz channels, and in turn receives probe responses 112 from the access node 106 on both the channels 102, 104, or the access node playing both the Autonomous Group Owner (AGO) roles.

Thus the dual band capable remote client device 108 discovers both the AGOs. But since both AGOs share a single discovery address (P2P-Device Address) and a single device-name, the remote client device 108 sees just one entry of the AGO. So this creates ambiguity and uncertainty as to which AGO (2.4 GHz or 5 GHz) does the remote client device 108 show to the end user and which AGO it connects to. Therefore, without implementation of a band steering method there is a chance that the remote client device 108 can connect via the first radio band 102, i.e. to the 2.4 GHz AGO which is not desirable.

On receiving a probe request 110 from the client device 108 on either of its bands 102, 104, the access node 106 may or may not generate a probe response 112 depending on certain conditions. The controller 114 controls the generation of the probe response 112 by the access nodes 106. The control is so executed that a probe response 112 is only generated when the probe request 110 is received from a single band capable client device 108 or when the probe request 110 indicates that the client device 108 has dual band capability and the probe request 112 is received by the access node 106 on the second 104 radio band.

Therefore, a probe response 112 is found to be generated by the access node 106 in response to a probe request 110 received from a client device 108 when the probe request 110 is received by the access node 106 on the first 102 radio band, for example on the 2.4 GHz channel, from a device 108 with the WPS information element in the probe request 110 indicating single band capability. In a second situation, a probe response 112 is found to be generated when the probe request 110 is received by the access node 106 on a second 104 radio band, for example on the 5 GHz channel.

However, when a client device 108 sends a probe request 110 indicating dual band capability on a first band 102 of the access node 106, the controller 114 prohibits the access node 106 from generating a probe response 112. Due to a lack of probe response 112 from the access node 106, the client device 108 having dual band capability is not able to connect on the first radio band 102. In this way the controller 114 is able to steer the client device 108 having single band capability to the access node 106 on the first 102 radio band and the client device 108 having dual band capability to the access node 106 on the second 104 radio band in response to the probe response 112 sent by the access node 106 and subsequently received by the client devices 108.

According to an embodiment of the system 1000 shown in FIG. 1 the controller 114 analyses the probe requests 110 received by the dual band access node 106 on both the bands 102, 104. The controller 114 reads the information carried by the probe request 110. The information residing in the probe request 110 indicates if the client device 108 has single band capability or dual band capability.

The system 1000 further comprises a memory unit 116 connected with the controller 114. The controller 114 may save in the memory unit 116 the result of determination as to which of the client devices 108 are single band capable client devices and which are dual band capable client devices. In an embodiment the memory unit 116 saves a list of dual band capable client devices for future use to save time. In another embodiment the memory unit 116 saves a list of single band capable client devices and a list of dual band capable client devices. The memory unit 120 may be implemented, for example, using a non-volatile memory such as a programmable read only memory (PROM) or an EPROM, and/or a volatile memory such as a DRAM, etc.

Figure 2:
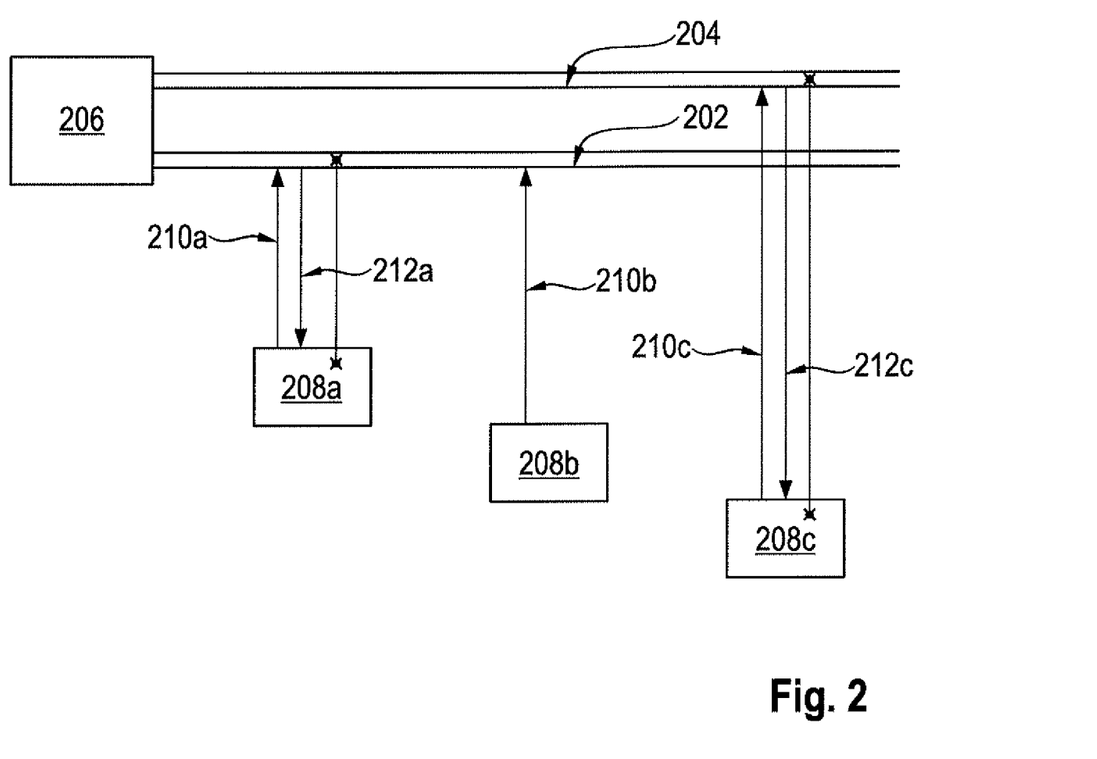
FIG. 2 schematically shows another example system in accordance with one of a number of embodiments.

FIG. 2 shows another example system 2000 in accordance with one of a number of embodiments. FIG. 2 shows several connection attempts made by different client devices 208a, 208b, 208c. According to FIG. 2, the client device 208a sends a probe request 210a to the first band 202 of the access node 106. The probe request 210a carries information indicating that the client device 208a has single band capability. The access node 206 generates a probe response 212a replying to the probe request 210a received from the client device 208a. The probe response 212a is transmitted through the first band 202. On receiving the probe response 212a from the access node 206 on the first band 202, the client device 208a is now able to use the first band 202 for communications within the network.

Further, according to FIG. 2, the client device 208b sends a probe request 210b to the first band 202 of the access node 106. The probe request 210b carries information indicating that the client device 208b has dual band capability. The access node 206 does not generate a probe response to the probe request 210b received from the client device 208b. On receiving no probe response from the access node 206 on the first band 202, the client device 208b is not able to use the first band 202 for communications within the network.

In further operation of the system 2000 illustrated in FIG. 2, the client device 208c sends a probe request 210c to the second band 204 of the access node 106. The probe request 210c carries information indicating that the client device 208c has dual band capability. The access node 206 generates a probe response 212c replying to the probe request 210c received from the client device 208c. The probe response 212c is transmitted through the second band 204. On receiving the probe response 212c from the access node 206 on the second band 204, the client device 208c is now able to use the second band 204 for communications within the network. According to an embodiment all probe requests 210c received on the second band 204 of the access node 206 receive a prompt probe response 212c from the access node 206 for connection as it is understood that only a dual band capable device 208c is capable of sending a probe request 210c on the second band 204 of the access node 206. Therefore, the information indicating dual band capability in the probe request 210c may not even need to be read.

According to the system 2000 shown in FIG. 2, the dual band capable client devices 208b, 208c are able to discover and subsequently connect via the access node 206 only on the second band 204 as the access node 206 is controlled to suppress the generation of a probe response when an attempt is made by the dual band capable client device 208b to connect on the first band 202. As a result, only the access node 206 on the second radio band 204, i.e. the 5 GHz channel, is visible as an available access node 206 for connecting to the network, to the client devices 208b, 208c having dual band capability. In this way the less congested band, in this example the 5 GHz band 204, is appropriately picked up by devices 208c that are capable of supporting dual bands instead of the slower, first radio band 202.

Figure 3:
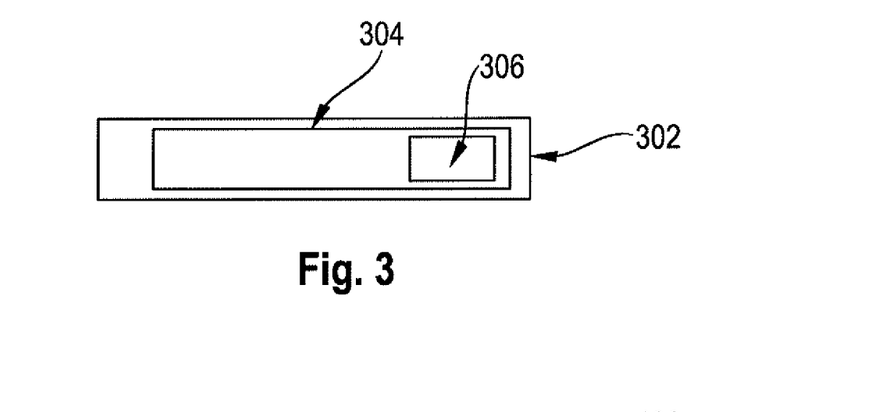
FIG. 3 schematically shows an example probe request in accordance with one of a number of embodiments.

FIG. 3 depicts an exemplary probe request 302 signal and its constituents among one of a number of embodiments. All Wi-Fi Direct (Wi-Fi Peer-to-Peer (P2P)) devices use a security protocol called WPS (Wi-Fi Protected Setup) during connection. This protocol involves eight-way handshakes in which eight messages get exchanged between the two devices trying to establish a connection with each other. Both devices indicate support and capability parameters of the WPS protocol by including a WPS information element 304 consisting of many attributes in the various Wi-Fi management frames as defined by the standard specification. The probe request 302 is also one of the management frames that are mandated to include the WPS information element 304.

In one of many embodiments the probe request 302 carries a WPS information element 304 of the client device 108. The client device 108 uses a Wi-Fi Protected Setup (WPS) Protocol, wherein the WPS information element 304, residing in the probe request 302, indicates if the client device 108 has single band capability or dual band capability.

According to one of many embodiments, one of the attributes in the WPS information element 304 is called an RF band attribute 306. In other words, the WPS information element 304 of the client device 108, carried in the probe request 302, may further comprise an RF band attribute 306. RF band attribute 306 may indicate if the client device 108 sending the WPS information element 304 in the management frame contained in the probe request 302 is a dual band capable device or a single band capable device.

In one exemplary embodiment, the dual band capable devices 208b, 208c shall have this attribute as: "RF Bands:

2.4 and 5 GHz (0×03)" and the single band capable devices 208a shall have this attribute as: "RF Bands: 2.4 GHz (0×01)".

The controller 114, shown in FIG. 1, makes use of the WPS information element 304, shown in FIG. 3, to determine which is a dual band capable client device 208b, 208c and which is a single band capable device 208a in the network 100 and take necessary actions based on that determination.

Figure 4:
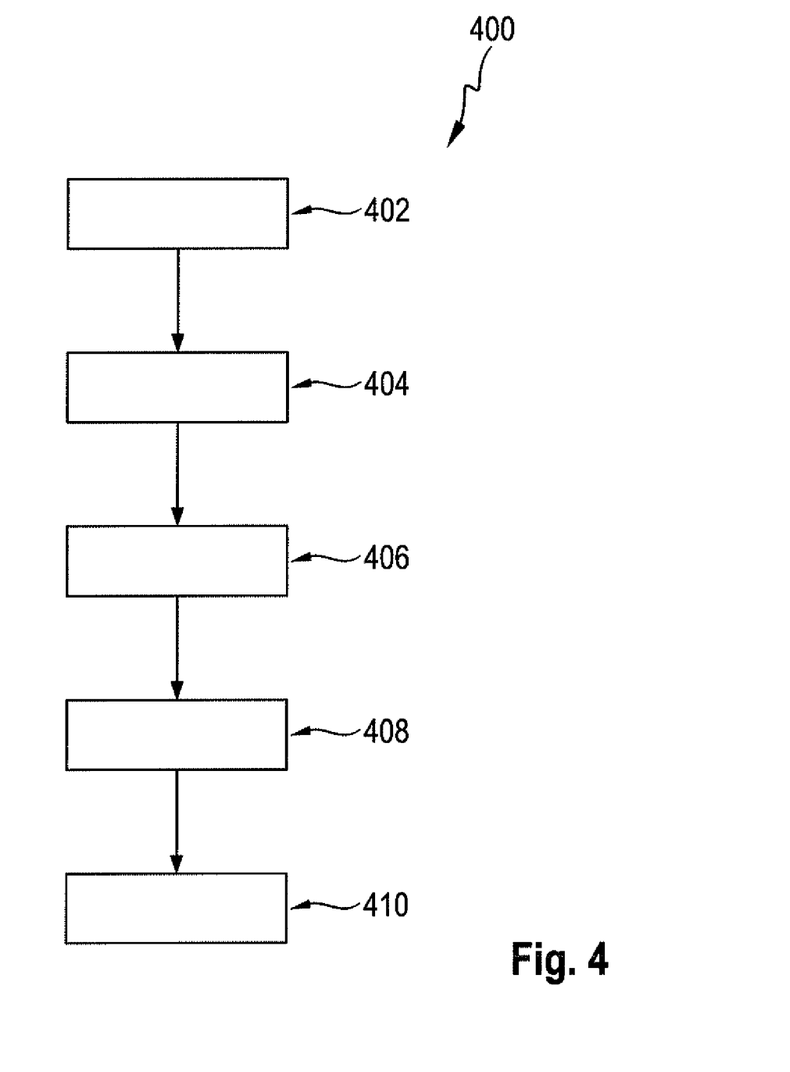
FIG. 4 is a flow chart for an example method in accordance with one of a number of embodiments.

FIG. 4 is a flowchart illustrating a method 400 in accordance with one of many embodiments. The method 400, as depicted in FIG. 4, comprises a first step 402 of transmitting a probe request 110 by the client device 108 on one or more of the radio bands 102, 104 available with the access node 106. The second step 404 constitutes receiving the probe request 110 on one or more of radio bands 102, 104 by the access node 106 capable of supporting both the radio bands 102, 104.

The next step 406 of the method 400 comprises determining whether the client device 108 sending the probe request 110 has single band capability or dual band capability. This determination is made from the information carried by the probe request 110. This elements of information, residing in the probe request 110, indicates if the client device 108 has single band capability or dual band capability.

The next step 408 comprises the generation or suppression of a probe response 112 by the access node 106. In an embodiment of the method, three situations may arise. The first, where a probe request 110 is received on a first 102 radio band of the access node 106 from a client device 108 with the information in the probe request 110 indicating single band capability. The second, where a probe request 110 is received on a second 104 radio band from a client device 108. The third, where a probe request 110 is received on a first 102 radio band from a client device 108 with the information in the probe request 110 indicating dual band capability.

According to the method 400, a probe response 112 is generated by the access node 106 at all times when the first two enumerated situations take place. On the other hand, when the third situation takes place the access node 106, 206 does not generate any probe response 212 in response to the probe request 110, in other words the probe response 212 is suppressed.

Therefore, the probe response 112 is generated only when the probe request 110 is received by the access node 106 on a first 104 radio band from a device 108 with the probe request 110 indicating single band capability or when the probe request 110 is received by the access node 106 on a second 104 radio band. Whereas, there is no probe response generated in case of a dual band capable device 108 trying to connect to the first radio band 102 via the access node 206 on the first radio band 102.

The next step 410 in the method 400 comprises steering the client device 108 having single band capability to the access node 106 on the first 102 radio band and the client device 108 having dual band capability to the access node 106 on the second 104 radio band based on the probe response 112 generated at the access node 106.

These above steps ensure that a dual band capable client device 108 shall always be able to discover only the access node 106 on the second radio band 104. For example, a dual band capable remote Wi-Fi Direct client device 108 shall be able to connect to the access node 106 on the 5 GHz channel 104 only and shall not be able to discover the access node 106 on the first radio band 102, i.e. the 2.4 GHz channel 102.

Whereas, a single band capable client device 108 shall be able to discover the first radio band 102, for example, be able to connect to the access node 106 on the 2.4 GHz channel 102.

Hence this method 400 ensures that these remote devices 108 can only initiate Wi-Fi Direct connections with the access nodes 108 on the radio bands 102, 104 that they have discovered. Hence, according to an exemplary embodiment, a dual band capable client device 108 can initiate connection only with the 5 GHz autonomous group owner or access node 106 and a single band capable client device 108 can initiate connection only with the 2.4 GHz autonomous group owner or access node 106. This ensures proper and efficient bandwidth sharing on both the bands 102, 104.

According to an exemplary embodiment of the system 1000, in an extra ordinary situation when the second radio band or channel 104 is, for some reason, not available to the dual band capable devices 108, an exception may be configured in the controller 114 which would enable the dual band capable devices 108 to discover the access node 106 on the first radio band 102 only after a certain period of time has elapsed since the dual band capable device 108 has started sending out probe requests 110 on the radio bands 102, 104 attempting to seek a connection and has not been successful.

The description of embodiments has been presented for purposes of illustration and description. Suitable modifications and variations to the embodiments may be performed in light of the above without departing from the scope of protection as determined by the claims.

In particular, whilst some of the above examples are described in connection with Wi-Fi Direct networks, the embodiments disclosed herein may also be implemented in other wireless networks that require client devices to be channeled to a preferred band or network over another less preferred band or network.

The invention claimed is:

1. A band steering method for a wireless network comprising at least first and second radio bands, at least one access node, and a plurality of client devices, wherein the client devices either have single or dual band capability, the method comprising:
   receiving, by the access node, a probe request from one of said client devices on the first or second radio band, wherein the probe request indicates whether the client device has single or dual band capability; and
   generating, by the access node, a probe response only if:
      (i) the probe request indicates that the client device has single band capability, or
      (ii) the probe request indicates that the client device has dual band capability and the probe request is received by the access node on the second radio band; and
   wherein the probe response is to cause the client device to use the first or second radio band for communications within the network,
   wherein the probe request is a request seeking to establish a connection for communication purposes through one of the first or second radio band, the probe request comprising a WPS information element of the client device using Wi-Fi Protected Setup (WPS) Protocol, wherein the WPS information element indicates if the client device has single band or dual band capability,
   wherein the method is implemented by a Wi-Fi chipset firmware.

2. The method according to claim 1, wherein the access node is located in an automotive infotainment head unit.

3. The method according to claim 1, wherein the access node is a dual band Wi-Fi Direct or Wi-Fi Peer-to-Peer (P2P) Autonomous Group Owner.

4. The method according to claim 1, wherein the client devices support Wi-Fi Direct or Wi-Fi Peer-to-Peer (P2P) group owner role and Wi-Fi Direct or Wi-Fi P2P client role.

5. The method according to claim 1, wherein the WPS information element comprises an RF band attribute.

6. The method according to claim 1, wherein the WPS information element comprises Wi-Fi Protected Setup Protocol parameters.

7. The method according to claim 1, wherein the first radio band is a 2.4 GHz industrial, scientific and medical (ISM) radio band and the second radio band is a 5 GHz ISM radio band.

8. A system comprising:
at least one controller; and
a network, the network comprising:
  at least one access node controlled by the controller;
  at least a first and a second radio bands; and
  a plurality of client devices, wherein the client devices either have single or dual band capability;
  wherein the access node is arranged to
    receive a probe request from one of said client devices on the first or second radio band, wherein the probe request indicates whether the client device has single or dual band capability, wherein the probe request is a request seeking to establish a connection for communication purposes through one of the first or second radio band, the probe request comprising a WPS information element of the client device using Wi-Fi Protected Setup (WPS) Protocol, wherein the WPS information element indicates if the client device has single band or dual band capability; and
    generate a probe response only if:
      (i) the probe request indicates that the client device has single band capability, or
      (ii) the probe request indicates that the client device has dual band capability and the probe request is received by the access node on the second radio band; and
  wherein the probe request response is to cause the client device to use the first or second band for communications within the network,
  wherein the controller is configured to provide an exception probe response responsive to the probe request during conditions where it is determined that the second radio band is not available to dual band capable client devices.

9. The system according to claim 8, wherein the system further comprises a memory unit for storing a list of client devices found to be dual band capable.

10. The system according to claim 8, wherein the access node is a Wi-Fi Direct or Wi-Fi Peer-to-Peer (P2P) Autonomous Group Owner.

11. The system according to claim 8, wherein the access node is located in an automotive infotainment head unit.

12. An access node of a wireless network, the access node comprising:
a processor; and
a non-transitory computer readable medium storing instructions executable by the processor to:
  receive, by the access node that is already a Wi-Fi Direct or Wi-Fi Peer-to-Peer (P2P) Autonomous Group Owner, a probe request from a client device on a first or second radio band, wherein the probe request indicates whether the client device has single or dual band capability, wherein the probe request is a request seeking to establish a connection for communication purposes through one of the first or second radio band, the probe request comprising a WPS information element of the client device using Wi-Fi Protected Setup (WPS) Protocol, wherein the WPS information element indicates if the client device has single band or dual band capability; and
  generating, by the access node, a probe response only if:
    (i) the probe request indicates that the client device has single band capability, or
    (ii) the probe request indicates that the client device has dual band capability and the probe request is received by the access node on the second radio band;
  wherein the probe response is to cause the client device to use the first or second radio band for communications within the wireless network.

13. The access node according to claim 12, wherein the WPS information element comprises Wi-Fi Protected Setup Protocol parameters.

14. The access node according to claim 12, wherein the first radio band is a 2.4 GHz industrial, scientific and medical (ISM) radio band and the second radio band is a 5 GHz ISM radio band.

15. The access node according to claim 12, wherein the access node is located in an automotive infotainment head unit.

16. The access node according to claim 12, wherein the access node is a dual band Wi-Fi Direct or Wi-Fi Peer-to-Peer (P2P) Autonomous Group Owner.

17. The system according to claim 8, wherein the exception probe response enables discovery of the first radio band for dual band capable client devices.

* * * * *